(12) United States Patent
Jing et al.

(10) Patent No.: US 6,753,087 B2
(45) Date of Patent: Jun. 22, 2004

(54) FLUOROPOLYMER BONDING

(75) Inventors: Naiyong Jing, Woodbury, MN (US); Andrew M. Hine, St. Paul, MN (US); William J. Schultz, Vadnais Heights, MN (US); Trang D. Pham, Bloomington, MN (US); Christopher A. Haak, Oakdale, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/862,124

(22) Filed: May 21, 2001

(65) Prior Publication Data

US 2002/0197481 A1 Dec. 26, 2002

(51) Int. Cl.$^7$ .............................................. B32B 27/18
(52) U.S. Cl. ....................................... 428/421; 428/447
(58) Field of Search ................................ 428/421, 447, 428/429, 448, 450, 457

(56) References Cited

U.S. PATENT DOCUMENTS

| | | | |
|---|---|---|---|
| 2,789,063 A | 4/1957 | Purvis et al. ................. 117/47 |
| 3,558,345 A | 1/1971 | Baum et al. | |
| 3,563,871 A | 2/1971 | Newman et al. ....... 204/159.14 |
| 4,112,139 A | 9/1978 | Shirk et al. ................... 427/54 |
| 4,164,463 A | 8/1979 | Fang ........................... 204/296 |
| 4,186,084 A | 1/1980 | Fang ....................... 210/23 H |
| 4,233,421 A | 11/1980 | Worm ......................... 525/343 |
| 4,261,800 A | 4/1981 | Beckenbaugh et al. ....... 204/15 |
| 4,338,237 A | 7/1982 | Sulzbach et al. ............ 524/777 |
| 4,613,653 A | 9/1986 | Kitchens et al. ............ 525/352 |
| 4,775,449 A | 10/1988 | Dumas et al. ................ 204/30 |
| 4,824,692 A | 4/1989 | Gillick et al. ............. 427/53.1 |
| 4,912,171 A | 3/1990 | Grootaert et al. ........... 525/340 |
| 5,051,312 A | 9/1991 | Allmér ....................... 428/458 |
| 5,086,123 A | 2/1992 | Guenthner et al. ......... 252/276 |
| 5,217,837 A * | 6/1993 | Henry et al. ................ 430/124 |
| 5,262,490 A | 11/1993 | Kolb et al. .................. 525/343 |
| 5,284,611 A | 2/1994 | Grootaert et al. ........... 264/135 |
| 5,285,002 A | 2/1994 | Grootaert .................... 526/222 |
| 5,320,789 A | 6/1994 | Nishii et al. .................. 264/22 |
| 5,419,968 A | 5/1995 | Okada et al. ............... 428/421 |
| 5,470,617 A | 11/1995 | Nishii et al. ................ 427/521 |
| 5,478,652 A | 12/1995 | Grootaert et al. ........... 428/422 |
| 5,580,616 A | 12/1996 | Niino et al. ................ 427/554 |
| 5,656,121 A * | 8/1997 | Fukushi ...................... 156/326 |
| 5,658,671 A | 8/1997 | Fukushi ...................... 428/421 |
| 5,734,085 A | 3/1998 | Coggio et al. ................ 568/19 |
| 5,859,086 A | 1/1999 | Freund et al. ................ 522/83 |
| 5,882,466 A | 3/1999 | Grootaert et al. | |
| 6,117,497 A | 9/2000 | Murahara et al. ........... 427/581 |
| 6,255,384 B1 | 7/2001 | McCarthy et al. .......... 524/805 |

FOREIGN PATENT DOCUMENTS

| | | |
|---|---|---|
| EP | 0 867 785 A2 | 9/1998 |
| JP | 03 093874 A | 4/1991 |
| JP | 06-279590 | 10/1994 |
| JP | 70 96575 | 4/1995 |
| JP | 07-179628 | 7/1995 |
| JP | 07-179636 | 7/1995 |
| JP | 09-193164 | 7/1997 |
| JP | 2000-256488 | 9/2000 |
| WO | WO 96/05965 A1 | 2/1996 |

OTHER PUBLICATIONS

Handbook of Coating Additives: Chap 10: Adhesion Promoters, ed Leonard J. Calbo, Dec. 1987.*

(List continued on next page.)

*Primary Examiner*—Ramsey Zacharia
(74) *Attorney, Agent, or Firm*—James V. Lilly; Brian E. Szymanski

(57) ABSTRACT

A multi-layer structure includes a fluoropolymer bonded to a substrate. The structure is prepared by heating a bonding composition to form the bond. The bonding composition includes an amino-substituted organosilane. The bonding composition includes non-adhesive materials.

3 Claims, 1 Drawing Sheet

OTHER PUBLICATIONS

*Appl. Phys. Lett.*, vol. 54, No. 1, Jan. 2, 1989, ©1988 American Institute of Physics, "Ablation of Polytetrafluoroethylene (Teflon) with Femtosecond UV Excimer Laser Pulses", S. Küper and M. Stuke, p. 4–6.

*Appl. Phys. Lett.*, vol. 63, No. 25, Dec. 20, 1993, "Surface Modification and Metallization of Fluorocarbon Polymers by Excimer Laser Processing", H. Niino and A. Yabe.

*Chemistry Letters*, pp. 1637–1638, 1993; ©The Chemical Society of Japan, "Endowment With The Wettability On The Surface of Tetrafluoroethylene–Perfluoroalkyl Vinyl Ether Copolymer By Excimer Laser Irradiation"; Atsushi Okada, Yasuo Negishi, Yuichi Shimizu, Shun'ichi Sugimoto, Masanobu Nishii, and Shunichi Kawanishi Aug. 1993.

Elsevier, *Applied Surface Science 109/110* p. 222–226, "Excimer Laser Induced Surface Chemical Modification of Polytetrafluoroethylene", K. Révész, B. Hopp, Z. Bor, Dec. 1997.

Dahm, R. in: "Surface Analysis and Pretreatment of Plastics and Metals", Applied Science Publishers, New York, p. 1–11, Jan. 1982.

Siperko, L.M.; Thomas, R.R.; *Journal Adhesion Sci, Technol.* vol. 3, p. 157 Mar. 1989.

Rye, R.R.; Arnold, G.W.; *Langmuir*, vol. 5, p. 1331 May 1989.

Clark, D.T.; Hutton, D.R.; *Journal Polym.Sci., Polym. Chem. Ed.*, vol. 25, p. 2643, Jan. 1987.

Weismann, S.I.; *Journal Phys. Chem.*, vol. 22, p. 1135, Jan. 1954.

Yao, T.; Musha, S.; Munemori, M.; *Chem.Lett.*, p. 939, Dec. 1974.

Allmer, K.; Feiring, A.E.; *Macromolecules* vol. 24, p. 5487, Jul. 1991.

Costello, C.A.; McCarthy, T.J.; *Macromolecules* vol. 17, p. 2941, Jul. 1984.

Iqbal, Z.; Ivory, D.M.; Szobota, J.S.; Elsenbaumer, R.L.; Baughman, R.H.; *Macromolecules*, vol. 19, p. 2992, Jul. 1986.

Kiplinger, J.L.; Richmond, T.G.; Osterberg, C.E.; *Chem Rev.* vol. 94, p. 341, Feb. 1994.

MacNicol, D.D.; Robertson, C.D.; *Nature* 332, 59, Mar. 1988.

Cooper, D.L.; Allan, N.L.; Powell, R.L.; *Journal Fluorine Chem.*, vol. 49, p. 421, Jul. 1990.

Marsella, J.A.; Gilicinski, A.G.; Coughlin, A.M.; Pez, G.P.; *Journal Organic Chem.*, vol. 57, p. 2856, Jan. 1992.

Burdeniuc, J.; Chupka, W.; Crabtree, R.H.; *Journal Am. Chem. Soc.*, 117, 10119, Jan. 1995.

Burdeniuc, J.; Crabtree, R.H.; *Science*, 1996, 271,340, Sep. 1996.

Kaprinidis, N.A.; Turro, N.J.; *Tetrahedron Lett.*, 37, 2373, Jul. 1996.

Plueddemann, E.P.; *Silane Coupling Agents*, Plenum Press, NY, pp. 188–205, Jan. 1982.

Plueddemann, E.P.; *Silane Coupling Agents*, Second Edition, Plenum Press, NY, pp. 101–113, Jan. 1991.

Chemlok® 607, "Silicone Rubber & Specialty Elastomer Adhesive", Lord Corporation, Jan. 2000.

Related Application U.S. Ser. No. 09/862,022, Filed May 21, 2001.

Related Application U.S. Ser. No. 09/862,125, Filed May 21, 2001.

*Semiconductor International*, 11, Burggraf, Pieter, No. 8, 55 Jul. 1988.

Database WPI, Week 8411, Derwent Publications, Ltd., London, GB: AN 1984–066964, XP002209025 & Research Disclosure4, NR. 238006, Kenneth Mason Publications, vol. 238, No. 006, 1984, Hampshire, UK, Feb., 1984.

* cited by examiner

FLUOROPOLYMER BONDING

TECHNICAL FIELD

This invention relates to methods and compositions for bonding a fluoropolymer to a substrate.

BACKGROUND

Fluorine-containing polymers (also known as "fluoropolymers") are a commercially useful class of materials. Fluoropolymers include, for example, crosslinked fluoroelastomers and semi-crystalline or glassy fluoropolymers. Fluoropolymers are generally of high thermal stability and are particularly useful at high temperatures. They may also exhibit extreme toughness and flexibility at very low temperatures. Many of these fluoropolymers are almost totally insoluble in a wide variety of solvents and are generally chemically resistant. Some have extremely low dielectric loss and high dielectric strength, and may have unique non-adhesive and low friction properties. Fluoroelastomers, particularly the copolymers of vinylidene fluoride with other ethylenically unsaturated halogenated monomers such as hexafluoropropylene, have particular utility in high temperature applications such as seals, gaskets, and linings.

Multi-layer constructions containing a fluoropolymer enjoy wide industrial application. Such constructions find utility, for example, in fuel line hoses and related containers and hoses or gaskets in the chemical processing field. Adhesion between the layers of a multi-layered article may need to meet various performance standards depending on the use of the finished article. However, it is often difficult to establish high bond strengths when one of the layers is a fluoropolymer, in part, because of the non-adhesive qualities of fluoropolymers. Various methods have been proposed to address this problem. One approach is to use an adhesive layer or tie layer between the fluoropolymer layer and the second polymer layer. Surface treatments for the fluoropolymer layer, including the use of powerful reducing agents (e,g., sodium naphthalide) and corona discharge, have also been employed to enhance adhesion. In the case of fluoropolymers containing interpolymerized units derived from vinylidene fluoride, exposure of the fluoropolymer to a dehydrofluorinating agent such as a base has been used, as well as polyamine reagents applied to the fluoropolymer surface or incorporated within the fluoropolymer itself.

SUMMARY

A multi-layer structure includes a fluoropolymer bonded to a substrate. The structure is prepared by heating a bonding composition, and optionally under pressure, to form the bond. The bonding composition includes an amino-substituted organosilane. The bonding composition includes non-adhesive materials.

In one aspect, a method of bonding a fluoropolymer to a substrate includes providing a bonding composition between a fluoropolymer and a substrate to form a primed article and heating the primed article to a temperature and optionally applying pressure for a sufficient time to bond the fluoropolymer and the substrate to form a bonded article. The bonding composition includes an amino-substituted organosilane. The primed article may be heated to a temperature between 50 and 300° C., preferably between 100 and 250° C.

The bonding composition may be provided between the fluoropolymer and the substrate in different ways. For example, a surface of the fluoropolymer may be treated with the bonding composition and the treated surface of the fluoropolymer may be contacted with a surface of the substrate, or a surface of the substrate may be treated with the bonding composition and the treated surface of the substrate may be contacted with a surface of the fluoropolymer. In certain embodiments, a mixture of the fluoropolymer and the bonding composition may be extruded and a surface of the extruded mixture may be contacted with a surface of the substrate. In other embodiments, the substrate or the fluoropolymer may be cast from solution or polymerized from a monomer.

In another aspect, a method of bonding a fluoropolymer to a substrate includes treating a surface of the fluoropolymer with a bonding composition including an amino-substituted organosilane having a hydrolyzable substituent, contacting the treated surface of the fluoropolymer with a surface of a substrate, and heating the contacted surfaces to a temperature for a sufficient time to bond the fluoropolymer and the substrate to form a bonded article.

In yet another aspect, a method of bonding a fluoropolymer to a substrate includes extruding a mixture of a fluoropolymer and a bonding composition including an amino-substituted organosilane having a hydrolyzable substituent, contacting a surface of the extruded mixture with a surface of a substrate, and heating the contacted surfaces to a temperature for a sufficient time to bond the fluoropolymer and the substrate to form a bonded article.

In yet another aspect, a bonded article includes a fluoropolymer having a surface, a substrate having a surface, and a bonding composition interposed between the surface of the fluoropolymer and the surface of the substrate, the bonding composition including an amino-substituted organosilane. In another aspect, a laminated article includes a first layer having a surface and a substrate having a surface in contact with the surface of the first layer, in which the first layer includes a fluoropolymer and a bonding composition including an amino-substituted organosilane. The substrate may include an inorganic substrate, such as a metal or a glass, or an organic substrate, such as a non-fluorinated polymer. The fluoropolymer may include a polymer derived from a monomer selected from the group consisting of a vinylidene fluoride monomer, and ethylene combined with a comonomer, the comonomer being selected from the group consisting of tetrafluoroethylene, hexafluoropropylene, chlorotrifluoroethylene, 3-chloropentafluoropropene, a perfluorinated vinyl ether, vinyl fluoride and a fluorine-containing diolefin.

The amino-substituted organosilane may have a hydrolyzable substituent. The amino-substituted organosilane may be 3-aminopropyltrimethoxysilane, 3-aminopropyltriethoxysilane, (aminoethylaminomethyl)phenethyltrimethoxysilane, (aminoethylaminomethyl)phenethyltriethoxysilane, N-(2-aminoethyl)-3-aminopropylmethyldimethoxysilane, N-(2-aminoethyl)-3-aminopropyltris(2-ethylhexoxy)silane, 6-(aminohexylaminopropyl)trimethoxysilane, 4-aminobutyltrimethoxysilane, 4-aminobutyltriethoxysilane, p-aminophenyltrimethoxysilane, 3-(1-aminopropoxy)-3,3,-dimethyl-1-propenyltrimethoxysilane, 3-aminopropyltris(methoxyethoxyethoxy)silane, 3-aminopropylmethyldiethoxysilane, 3-aminopropyltrimethoxysilane, or aminoundecyltrimethoxysilane.

The bonding composition may include a phase transfer catalyst or an acid catalyst. Preferably, the phase transfer catalyst or acid catalyst may be a phosphonium salt, an ammonium salt, a fluoroaliphatic sulfonyl compound, a perfluoroalkylcarboxylic acid, or an arylcarboxylic acid.

The bonding composition may include a solvent to facilitate applying a coating of the composition to a surface of the fluoropolymer or the substrate, or both. The solvent may be removed, for example, by drying, prior to contacting the substrate and fluoropolymer surfaces. Any solvent, if used may be a fluorinated solvent, for example, a fluorinated solvent having at least one fluorinated moiety. Fluorinated solvents may be effective at promoting wetting of the bonding composition onto either substrate. Preferred fluorinated solvents include, for example, hexafluoroxylene, hexafluorobenzene, and the like.

Bonded multi-layer materials may have combined physical and chemical properties possessed by both fluoropolymers and non-fluorinated polymers, resulting in less expensive, well-performing articles. For example, the fluoropolymer component may be used in automotive hose and container constructions, anti-soiling films, low energy surface PSA tapes and coatings for aircraft. The bonding process is a mild photochemical lamination that may promote adhesion between a fluoropolymer and a substrate. The bonding composition may be used to form a composite article having a fluoropolymer cladding on a conductive and lustrous metal to protect it from corrosion, a fluoropolymer cladding on glass fibers to enhance their physical strength and chemical resistance for telecommunication, or a fluoropolymer layer bonded to a hydrocarbon substrate in a multi-layer materials.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
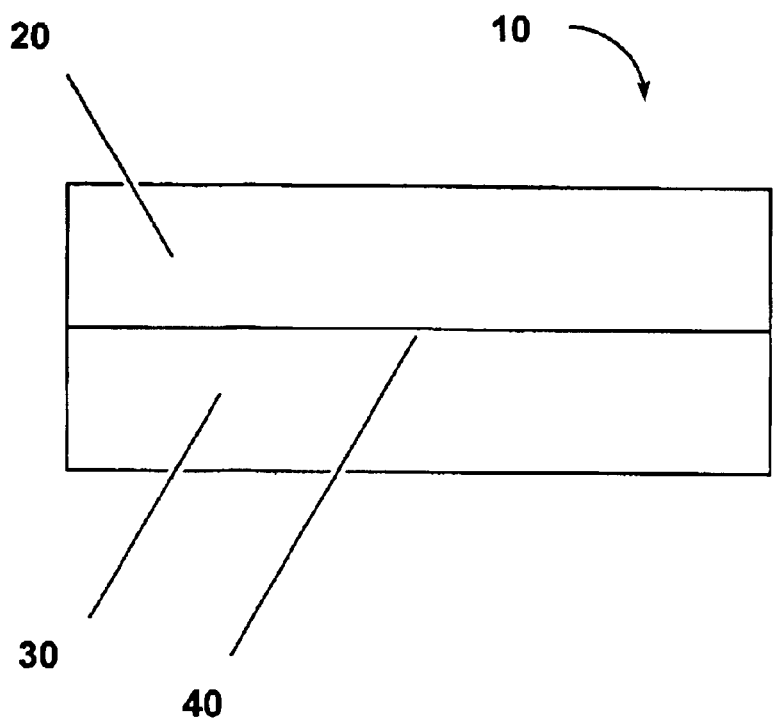
FIG. 1 is a cross-sectional view of a multi-layer article.

A fluoropolymer layer may be bonded on one surface of a substrate to form, for example, a laminate. The laminate may contain two or more layers. Referring to FIG. 1, the laminate 10 includes fluoropolymer layer 20 and the substrate 30. Bonding composition 40 contacts the interface between fluoropolymer layer 20 and substrate 30. Heating the bonding composition promotes bonding between fluoropolymer layer 20 and substrate 30.

The bonding composition includes an amino-substituted organosilane. The bonding composition may include a solvent to facilitate applying a coating of the composition to a surface of the fluoropolymers or the substrate, or both. The solvent may be removed, for example, by drying, prior to contacting the substrate and fluoropolymer surfaces. The amino-substituted organosilane may have a hydrolyzable substituent; for example, it may be a trialkoxysilane. For example, the amino-substituted organosilane may have the formula

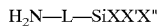

where L is a divalent straight chain C1–12 alkylene, C3–8 cycloalkylene, 3–8 membered ring heterocycloalkylene, C1–12 alkenylene, C3–8 cycloalkenylene, 3–8 membered ring heterocycloalkenylene, arylene, or heteroarylene. L is optionally substituted with C1–4 alkyl, C2–4 alkenyl, C2–4 alkynyl, C1–4 alkoxy, hydroxyl, halo, carboxyl, amino, nitro, cyano, C3–6 cycloalkyl, 3–6 membered heterocycloalkyl, monocyclic aryl, 5–6 membered ring heteroaryl, C1–4 alkylcarbonyloxy, C1–4 alkyloxycarbonyl, C1–4 alkylcarbonyl, formyl, C1–4 alkylcarbonylamino, or C1–4 aminocarbonyl. L is further optionally interrupted by —O—, —S—, —N(Rc)—, —N(Rc)—C(O)—, —N(Rc)—C(O)—O—, —O—C(O)—N(Rc)—, —N(Rc)—C(O)—N(Rd)—, —O—C(O)—, —C(O)—O—, or —O—C(O)—O—. Each of Rc and Rd, independently, is hydrogen, alkyl, alkenyl, alkynyl, alkoxy, hydroxylalkyl, hydroxyl, or haloalkyl; and each of X, X' and X" is a C1–18 alkyl, halogen, C1–8 alkoxy, C1–8 alkylcarbonyloxy, or amino group. When the amino-substituted organosilane has a hydrolyzable substituent, at least one of X, X', and X" is not alkyl. Further, any two of X, X' and X" may be joined through a covalent bond. The amino group may be an alkylamino group.

Examples of amino-substituted organosilanes include 3-aminopropyltrimethoxysilane, 3-aminopropyltriethoxysilane, aminoethylaminomethyl)phenethyltrimethoxysilane, (aminoethylaminomethyl)phenethyltriethoxysilane, N-(2-aminoethyl)-3-aminopropylmethyldimethoxysilane, N-(2-aminoethyl)-3-aminopropyltris(2-ethylhexoxy)silane, 6-(aminohexyl-aminopropyl)trimethoxysilane, 4-aminobutyltrimethoxysilane, 4-aminobutyltriethoxysilane, p-aminophenyltrimethoxysilane, 3-(1-aminopropoxy)-3,3,-dimethyl-1-propenyltrimethoxysilane, 3-aminopropyltris(methoxyethoxyethoxy)silane, 3-aminopropylmethyldiethoxysilane, 3-aminopropyltrimethoxysilane, and aminoundecyltrimethoxysilane.

The phase transfer catalyst or acid catalyst facilitates effective bonding by, for example, partially dissolving in the fluoropolymer or the substrate or both. The phase transfer catalyst may be an ammonium compound, a phosphonium compound, a sulfonium compound, a sulfoxonium compound, an iodonium compound, a fluoroaliphatic sulfonyl compound, a perfluorocarboxylic acid, an arylcarboxylic acid, or combinations thereof. Examples include benzyltriphenylphosphonium chloride, benzyltributylammonium chloride, an arylammonium salt, a triarylsulfonium chloride. Other examples of light-absorbing compounds are described, e.g., in Fukushi, U.S. Pat. No. 5,658,671, "Fluoroelastomer Coating Composition," hereby incorporated by reference.

The fluoropolymer may be a partially fluorinated polymer. For example, the fluoropolymer may be either melt-processible such as in the case of a terpolymer of tetrafluoroethylene, hexafluoropropylene and vinylidene fluoride (THV), polyvinylidene fluoride (PVDF), and other melt-processible fluoroplastics, or may be non-melt processable such as in the case of modified PTFE copolymers, such as a copolymer of TFE and low levels of fluorinated vinyl ethers and fluoroelastomers. Fluoroelastomers may be processed before they are cured by injection or compression molding or other methods normally associated with thermoplastics. Fluoroelastomers after curing or crosslinking may not be able to be further processed. Fluoroelastomers may also be coated out of solvent in their uncross linked form. Fluoropolymers may also be coated from an aqueous dispersion form. In preferred embodiments, the fluoropolymer may include THV, PVDF or mixtures thereof.

Preferably, the fluoropolymer is a material that is capable of being extruded or coated. Such fluoropolymers typically are fluoroplastics that have melting temperatures ranging from about 100 to about 330° C., more preferably from about 150 to about 270° C. Preferred fluoroplastics include interpolymerized units derived from VDF and fluoroethylene and may further include interpolymerized units derived from other fluorine-containing monomers, non-fluorine-containing monomers, or a combination thereof. Examples of suitable fluorine-containing monomers include tetrafluoroethylene (TFE), hexafluoropropylene (HFP), chlorotrifluoroethylene (CTFE), 3-chloropentafluoropropene, perfluorinated vinyl ethers (e.g., perfluoroalkoxy vinyl ethers such as $CF_3OCF_2CF_2CF_2OCF=CF_2$ and perfluoroalkyl vinyl ethers such as $CF_3OCF=CF_2$ and $CF_3CF_2CF_2OCF=CF_2$), vinyl fluoride, and fluorine-containing di-olefins such as perfluorodiallylether and perfluoro-1,3-butadiene. Examples of suitable non-fluorine-containing monomers include olefin monomers such as ethylene, propylene, and the like.

VDF-containing fluoroplastics may be prepared using emulsion polymerization techniques as described, e.g., in Sulzbach et al., U.S. Pat. No. 4,338,237 or Grootaert, U.S. Pat. No. 5,285,002, hereby incorporated by reference. Useful commercially available VDF-containing fluoroplastics include, for example, THV™ 200, THV™ 400, THV™ 500G, THV™ 610X fluoropolymers (available from Dyneon LLC, St. Paul, Minn.), KYNAR™ 740 fluoropolymer (available from Atochem North America, Philadelphia, Pa.), HYLAR™ 700 (available from Ausimont USA, Inc., Morristown, N.J.), and FLUOREL™ FC-2178 (available from Dyneon LLC).

A particularly useful fluoroplastic includes interpolymerized units derived from at least TFE and VDF in which the amount of VDF is at least 0.1% by weight, but less than 20% by weight. Preferably, the amount of VDF ranges from 3–15% by weight, more preferably from 10–15% by weight.

Examples of suitable fluoroelastomers include VDF-HFP copolymers, VDF-HFP-TFE terpolymers, TFE-propylene copolymers, and the like.

Other examples of fluoropolymers include THV™ (a terpolymer of $CF_2=CF_2/CF_3CF=CF_2/CF_2=CH_2$), THE (a terpolymer of $CF_2=CF_2/CF_3CF=CF_2/CH_2=CH_2$), PVDF-HV (a copolymer $CF_2=CH_2$(85 wt %)/$CF_3CF=CF_2$ (15 wt %)) and PVDF-CV (a copolymer of $CF_2=CH_2$(85 wt %)/$CF_2=CFCl$(15 wt %)).

The substrate may include an inorganic substrate, such as a metal or an inorganic glass, or an organic substrate, such as a fluoropolymer or a non-fluorinated polymer. Alternatively, the substrate may be an organic-inorganic composite. The metal may be copper or stainless steel. The inorganic glass may be a silicate. The non-fluorinated polymer may be a polyamide, a polyolefin, a polyurethane, a polyester, a polyimide, a polyimide, a polystyrene, a polycarbonate, a polyketone, a polyurea, a polyacrylate, and a polymethyl methacrylate, or a mixture thereof. For example, the non-fluorinated polymer may be a non-fluorinated elastomer, such as acrylonitrile-butadiene rubber (NBR), butadiene rubber, chlorinated and chlorosulfonated polyethylene, chloroprene rubber, ethylene-propylene monomer (EPM) rubber, ethylene-propylene-diene monomer (EPDM) rubber, epichlorohydrin (ECO) rubber, polyisobutylene rubber, polyisoprene rubber, polysulfide rubber, polyurethane, silicone rubber, blends of polyvinyl chloride and NBR, styrene butadiene (SBR) rubber, ethylene-acrylate copolymer rubber, and ethylene-vinyl acetate rubber. Suitable ethylene-vinyl acetate copolymers include ELVAX™ available from E.I DuPont de Nemours Co., Wilmington, Del.

Polyamides useful as the non-fluorinated polymer are generally commercially available. For example, polyamides such as any of the well-known nylons are available from a number of sources. Particularly preferred polyamides are nylon-6, nylon-6,6, nylon-11, and nylon-12. It should be noted that the selection of a particular polyamide material should be based upon the physical requirements of the particular application for the multi-layer article. For example, nylon-6 and nylon-6,6 offer better heat resistance properties than nylon-11 and nylon-12, whereas nylon-11 and nylon-12 offer better chemical resistance properties. In addition, other nylon materials such as nylon-6,12, nylon-6,9, nylon-4, nylon-4,2, nylon-4,6, nylon-7, and nylon-8 may be used, as well as ring-containing polyamides such as nylon-6,T and nylon-6,1. Suitable nylons include VESTAMID™ L2140, a nylon-12 available from Creanova, Inc. of Somerset, N.J. Polyether-containing polyamides, such as PEBAX™ polyamides (Atochem North America, Philadelphia, Pa.), may also be used.

Useful polyurethane polymers include aliphatic, cycloaliphatic, aromatic, and polycyclic polyurethanes. These polyurethanes are typically produced by reaction of a polyfunctional isocyanate with a polyol according to well-known reaction mechanisms. Useful diisocyanates for employment in the production of a polyurethane include dicyclohexylmethane-4,4'-diisocyanate, isophorone diisocyanate, 1,6-hexamethylene diisocyanate, cyclohexyl diisocyanate, and diphenylmethane diisocyanate. Combinations of one or more polyfunctional isocyanates may also be used. Useful polyols include polypentyleneadipate glycol, polytetramethylene ether glycol, polyethylene glycol, polycaprolactone diol, poly-1,2-butylene oxide glycol, and combinations thereof. Chain extenders such as butanediol or hexanediol may also be used in the reaction. Useful commercially available urethane polymers include MORTHANE™ L424.167 (MI=9.7), PN-04 or 3429 from Morton International, Seabrook, N.H., and X-4107 from B. F. Goodrich Co., Cleveland, Ohio.

Useful polyolefin polymers include homopolymers of ethylene, propylene, and the like, as well as copolymers of these monomers with, for example, acrylic monomers and other ethylenically unsaturated monomers such as vinyl acetate and higher alpha-olefins. Such polymers and copolymers may be prepared by conventional free radical polymerization or catalysis of such ethylenically unsaturated monomers. The degree of crystallinity of the polymer may vary. The polymer may, for example, be a semi-crystalline high density polyethylene or may be an elastomeric copolymer of ethylene and propylene. Carboxyl, anhydride, or imide functionalities may be incorporated into the polymer by polymerizing or copolymerizing functional monomers such as acrylic acid or maleic anhydride, or by modifying the polymer after polymerization, e.g., by grafting, by oxidation, or by forming ionomers. Examples include acid modified ethylene acrylate copolymers, anhydride modified ethylene vinyl acetate copolymers, anhydride modified polyethylene polymers, and anhydride modified polypropylene polymers. Such polymers and copolymers generally are commercially available, for example, as ENGAGE™ (Dow-DuPont Elastomers, Wilmington, Del.) or EXACT™ (ExxonMobil, Linden, N.J.). For example, anhydride modified polyethylene polymers are commercially available from E. I. DuPont de Nemours & Co., Wilmington, Del., under the trade designation BYNEL™ co-extrudable adhesive resins.

Useful polyacrylates and polymethacrylates include polymers of acrylic acid, methyl acrylate, ethyl acrylate, acrylamide, methacrylic acid, methyl methacrylate, ethyl methacrylate, and the like. An example of a polymethacrylate is EMAC™ (Chevron Chemical Co., Houston, Tex.).

Useful polycarbonate polymers include aliphatic polycarbonates such as polyester carbonates, polyether carbonates, and bisphenol A derived polycarbonates, and the like. Useful polyimide polymers include polyimide polymers made from the anhydride of pyromellitic acid and 4,4'-diaminodiphenyl ether available from E. I. DuPont de Nemours and Company under the tradename KAPTON™. Variations include KAPTON™ H, KAPTON™ E and KAPTON™ V, among others.

Additional examples of useful non-fluorinated polymers, as noted above, include polyesters, polycarbonates, polyketones, and polyureas. Commercially available examples of such polymers include SELAR™ polyester (E. I. DuPont de Nemours & Co., Wilmington, Del.), LEXAN™ polycarbonate (General Electric, Pittsfield, Mass.), KADEL™ polyketone (Amoco, Chicago, Ill.), and SPECTRIM™ polyurea (Dow Chemical Co., Midland, Mich.).

Commercially available elastomers include NIPOL™ 1052 NBR (Zeon Chemical, Louisville, Ky.), HYDRIN™ C2000 epichlorohydrin-ethylene oxide rubber (Zeon Chemical, Louisville, Ky.), HYPALON™ 48 chlorosulfonated polyethylene rubber (E. I. DuPont de Nemours & Co., Wilmington, Del.), NORDEL™ EPDM (R.T. Vanderbilt Co., Inc., Norwalk, Conn.), VAMAC™ ethylene-acrylate elastomer (E. I. DuPont de Nemours & Co. Wilmington, Del.), KRYNAC™ NBR (Bayer Corp., Pittsburgh, Pa.), PERBUNAN™ NBR/PVC blend (Bayer Corp., Pittsburgh, Pa.), THERBAN™ hydrogenated NBR (Bayer Corp., Pittsburgh, Pa.), ZETPOL™ hydrogenated NBR (Zeon Chemical, Louisville, Ky.), SANTOPRENE™ thermoplastic elastomer (Advanced Elastomer Systems, Akron, Ohio), and KELTAN™ EPDM (DSM Elastomers Americas, Addis, La.).

The substrate may include a second fluoropolymer.

The substrate may have one or more surface polar functionality present thereon to enhance bonding, such as, for example, an amino, carboxyl and hydroxyl functionality.

The bonding composition may be deposited on a surface of the fluoropolymer, the substrate or both. In certain embodiments, the bonding composition may be incorporated into the fluoropolymer, the substrate, or both, such that when the surfaces contact each other, the bonding composition contacts the fluoropolymer and the substrate simultaneously. The bonding composition may be incorporated into the fluoropolymer or the substrate by melt mixing or extruding a mixture including the bonding composition. Alternatively, the bonding composition may be applied to a surface of the fluoropolymer or substrate by an process such as, for example, spray coating, curtain coating, immersion coating, dip coating, and the like.

Each of the fluoropolymer and the substrate, independently, may be provided as a film or as a molded or shaped article.

The fluoropolymer and substrate may contact each other, for example, under pressure, and be heated to bond the layers. Heat is applied at a temperature and time suitable to form a bond between the substrate and the fluoropolymer. For example, the temperature may be between 50 and 300° C., between 100 and 250° C., between 125 and 225° C., or between 150 and 220° C. In certain situations, more than one fluoropolymer layer may contact more than one surface of the substrate. In still other situations, two substrates may contact two surfaces of a fluoropolymer.

In many cases, heat, pressure, or combinations thereof, may be desired during bonding. Suitable heat sources include, but are not limited to, ovens, heated rollers, heated presses, infrared radiation sources, flame, and the like. Suitable pressure sources are well known and include presses, nip rollers, and the like.

The invention will now be described further by way of the following examples.

EXAMPLES

In the following examples, the term "wt %" means weight percent based on total weight.

"Dyneon™ THV™ 500" refers to a terpolymer of TFE/HFP/VDF, having a melt temperature of 165° C.; "Dyneon™ THV™ 400" refers to a terpolymer of TFE/HFP/VDF, having a melt temperature of 150° C.; "Dyneon™ THV™ 200" refers to a terpolymer of TFE/HFP/VDF, having a melt temperature of 120° C.; "HTE" refers to a terpolymer of hexafluoropropylene, teterafluoroethylene and ethylene all available from Dyneon, L.L.C. of Oakdale, Minn.

"PVDF-HV" refers to "PVDF 11010" which is a tradename for a copolymer of hexafluoropropylene and vinylidene fluoride having a melting point of 160° C.; "PVDF-CV" refers to SOLEF™ PVDF-CV which is a copolymer of chlorotrifluoroethylene and vinylidene fluoride, both commercially available from Soltex Polymer Corp. of Houston, Tex.

"BYNEL™ 3101" is an acid modified ethylene-vinyl acetate copolymer; "ELVAX™ 450" is an ethylene-vinyl acetate copolymer having 18 wt % vinyl acetate and a Vicat softening temperature of 61° C.; "polyimide" refers to "KAPTON™ 100HN" film, all commercially available from E. I. DuPont de Nemours of Wilmington Del.

"EMAC™ 2202T" is a copolymer of ethylene and methyl acrylate, 80/20 by weight available from Chevron Chemical Co. of Houston, Tex.

"MORTHANE™ L424.167 (MI=9.7)" is an aliphatic polyurethane available from Morton, International of Chicago, Ill.

"VESTAMID™ L2140" refers to nylon 12 having a Vicat softening point of 140° C. commercially available from Creanova, Inc. of Somerset, N.J.

"Copper-coated polyimide" refers to "KAPTON™ 100HN" film that has been metallized with copper. "Gold-coated polyimide" refers to "KAPTON™ 100HN" film that has been metallized with gold.

Polycarbonate film refers to polyethylene terephthalate film of about 10 mils (0.25 mm) thickness.

Unless otherwise specified, additional materials used in the examples were readily available from general commercial vendors such Sigma-Aldrich Chemical Co. of Milwaukee, Wis.

Polymer films were prepared by placing polymer granules indicated in Tables 1 and 2 were placed between two sheets of polytetrafluoroethylene having a thickness of 0.38 mm and softening them for 2–3 minutes at 200° C. Subsequently, the softened materials were pressed for about 5 to 10 seconds between two heated platens of a Wabash Hydraulic press (Wabash Metal Products Company, Inc., Hydraulic Division, Wabash, Ind.) and immediately transferred to a cold Wabash hydraulic press at 13–15° C. and 2–4 psi. After cooling to room temperature in the cold press, round-shaped films of polymer having a thickness of 1.25 mm were obtained. Rectangular samples having dimensions of 1.27 cm by 5.08 cm (0.5 inch by 2 inch) were cut.

Three bonding compositions were prepared. A first bonding composition (BC 1) was prepared by dissolving 3-aminopropyltriethoxysilane (10 wt %) in methanol. A second bonding composition (BC 2) was prepared by dissolving 3-aminopropyltriethoxysilane (5 wt %) in methanol. A third bonding composition (BC 3) was prepared by mixing 3-aminopropyltriethoxysilane (5 wt %) and a catalytic amount (less than 1 wt %) of nonafluorobutylsulfonamide in methanol. All the above chemicals are available from Aldrich Chemical Co.

Each substrate was coated with one of the bonding composition solutions. It was not necessary to dry the bonding composition before forming the bond. Samples were prepared by contacting a fluoropolymer film surface with the bonding composition-coated substrate surface to form a laminate precursor. A strip of a silicone liner was inserted about 1.3 mm into the space between the films along the short edge for peel testing. In some cases, a slight force was applied to keep good surface contact. The laminated multi-layer samples were subjected to hot lamination for 2 minutes at 200° C., except in the case of nylon, for which the hot lamination was performed at 220–250° C. The heating was carried out using a Wabash Hydraulic Press Co. heated platen press to achieve a film thickness of 0.51 mm. After cooling to room temperature by a "cold press", the peel strength was measured (film thickness of 0.51 mm). The heating times are indicated in Tables 1 and 2.

Peel strength was used to determine the degree of bonding. Peel strength was determined in accordance with ASTM D-1876 (T-peel test). A SinTech 20 test machine (MTS Corporation, Eden Prairie, Minn.) was used with a 100 mm per minute crosshead speed. The peel strength was calculated as the average load measured during the peel test. The measured peel strengths are listed Tables 1 and 2.

TABLE 1

| Sample | Press (minutes at 180–200° C.) | Peel Strength (N/cm) |
|---|---|---|
| THV 500/BYNEL ™ 3101-BC1 | 2 | 16 |
| THV 200/BYNEL ™ 3101-BC1 | 2 | 23.1 |
| PVDF-HV/BYNEL ™ 3101-BC1 | 2 | 10.6 |
| PVDF-CV/BYNEL ™ 3101-BC1 | 2 | 5.3 |
| HTE/BYNEL ™ 3101-BC1 | 2 | 16.6 |
| THV 500/ELVAX ™ 450-BC1 | 2 | 22.0 |
| THV 200/ELVAX ™ 450-BC1 | 2 | 6.2 |
| PVDF-HV/ELVAX ™ 450-BC1 | 2 | 5.5 |
| PVDF-CV/ELVAX ™ 450-BC1 | 2 | 5.3 |
| HTE/ELVAX ™ 450-BC1 | 2 | 3.9 |
| THV 500/EMAC ™ 2202T-BC1 | 2 | 14.1 |
| THV 200/EMAC ™ 2202T-BC1 | 2 | 21.5 |
| PVDF-HV/EMAC ™ 2202T-BC1 | 2 | 7.9 |
| PVDF-CV/EMAC ™ 2202T-BC1 | 2 | 5.3 |
| HTE/EMAC ™ 2202T-BC1 | 2 | 12 |
| THV 500/MORTHANE ™ L424.167 (MI = 9.7)-BC1 | 2 | 7.9 |
| THV 200/MORTHANE ™ L424.167 (MI = 9.7)-BC1 | 2 | 23.2 |
| PVDF-HV/MORTHANE ™ L424.167 (MI = 9.7)-BC1 | 2 | 24.6 |
| HTE/MORTHANE ™ L424.167 (MI = 9.7)-BC1 | 2 | 12.3 |
| THV 500/VESTAMID ™ L2140-BC1 | 2 | 17 |
| THV 200/VESTAMID ™ L2140-BC1 | 2 | 21.1 |
| PVDF-HV/VESTAMID ™ L2140-BC1 | 2 | 30.0 |
| PVDF-CV/VESTAMID ™ L2140-BC1 | 2 | 14.1 |
| Gold-coated polyimide/THV 400 lamination to metallized surface-BC1 | 2 | >18 |
| Copper-coated polyimide/THV 400 lamination to metallized surface-BC1 | 2 | >18 |
| Polyimide/THV 400-BC1 | 2 | >18 |

TABLE 2

| Sample | Press (minutes at 180–200° C.) | Peel Strength (N/cm) |
|---|---|---|
| THV 200/BYNEL ™ 3101-BC 2 | 2 | 27.0 |
| THV 200/BYNBL ™ 3101-BC 3 | 2 | 27.9 |
| THV 500/BYNEL ™ 3101-BC 2 | 2 | 24.7 |
| THV 500/BYNEL ™ 3101-BC 3 | 2 | 28.2 |
| PVDF-HV/BYNEL ™ 3101-BC 2 | 2 | 11.8 |
| PVDF-HV/BYNEL ™ 3101-BC 3 | 2 | 22.4 |
| THV 200/ELVAX ™ 450-BC 2 | 2 | 8.6 |
| THV 200/ELVAX ™ 450-BC 3 | 2 | 22.0 |
| THV 500/ELVAX ™ 450-BC 2 | 2 | 24.5 |
| THV 500/ELVAX ™ 450-BC 3 | 2 | 28.2 |
| PVDF-HV/ELVAX ™ 450-BC 2 | 2 | 5.1 |
| PVDF-HV/ELVAX ™ 450-BC 3 | 2 | 10 |
| THV 200/EMAC ™ 2202T-BC 2 | 2 | 4.4 |
| THV 200/EMAC ™ 2202T-BC 3 | 2 | 6.2 |
| THV 500/EMAC ™ 2202T-BC 2 | 2 | 24.9 |
| THV 500/EMAC ™ 2202T-BC 3 | 2 | 28.2 |
| THV 400/polycarbonate-BC1 | 2 | 16 |
| PVDF-HV/EMAC ™ 2202T-BC 2 | 2 | 9.5 |
| PVDF-HV/EMAC ™ 2202T-BC 3 | 2 | 9.5 |

Other embodiments are within the scope of the following claims.

What is claimed is:

1. A bonded article comprising:

a fluoroplastic having a surface;

an organic substrate having one or more surface polar functionalities and having a surface; and an amino-substituted organosilane, incorporated into said substrate such that when the surface of said fluoroplastic is in contact with the surface of said substrate, at least some of the organosilane is in contact with both said fluoroplastic and said substrate.

2. The article of claim 1, wherein said bonding composition is incorporated by melt mixing or by extrusion.

3. The article of claim 1, wherein the fluoroplastic includes a polymer derived from a monomer selected from the group consisting of a vinylidene fluoride monomer, and ethylene combined with a comonomer, the comonomer being selected from the group consisting of tetrafluoroethylene, hexafluoropropylene, chlorotrifluoroethylene, 3-chloropentafluoropropene, a perfluorinated vinyl ether, and a fluorine-containing diolefin.

* * * * *

UNITED STATES PATENT AND TRADEMARK OFFICE
CERTIFICATE OF CORRECTION

PATENT NO. : 6,753,087 B2
DATED : June 22, 2004
INVENTOR(S) : Jing, Naiyong

It is certified that error appears in the above-identified patent and that said Letters Patent is hereby corrected as shown below:

Column 10,
Line 17, Table 2, $2^{nd}$ Sample: "THV 200/BYNBL$^{TM}$" should be shown as
-- THV 200/BYNEL$^{TM}$ --

Signed and Sealed this

Sixteenth Day of November, 2004

JON W. DUDAS
*Director of the United States Patent and Trademark Office*